United States Patent
Xiong et al.

(10) Patent No.: US 11,848,884 B2
(45) Date of Patent: Dec. 19, 2023

(54) SYSTEM AND METHODS FOR SUPPORT OF FREQUENCY HOPPING FOR UES WITH REDUCED BANDWIDTH SUPPORT

(71) Applicant: Apple Inc., Cupertino, CA (US)

(72) Inventors: Gang Xiong, Beaverton, OR (US); Debdeep Chatterjee, Santa Clara, CA (US); Seunghee Han, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 979 days.

(21) Appl. No.: 16/725,017

(22) Filed: Dec. 23, 2019

(65) Prior Publication Data

US 2020/0127792 A1  Apr. 23, 2020

Related U.S. Application Data

(63) Continuation of application No. 14/748,814, filed on Jun. 24, 2015, now Pat. No. 10,516,517.

(60) Provisional application No. 62/158,199, filed on May 7, 2015, provisional application No. 62/109,382, filed on Jan. 29, 2015.

(51) Int. Cl.

| *H04L 5/00* | (2006.01) |
|---|---|
| *H04B 1/713* | (2011.01) |
| *H04L 1/08* | (2006.01) |
| *H04L 1/00* | (2006.01) |
| *H04L 1/1607* | (2023.01) |

(52) U.S. Cl.
CPC ........... *H04L 5/0053* (2013.01); *H04B 1/713* (2013.01); *H04L 1/08* (2013.01); *H04L 5/0012* (2013.01); *H04B 2201/698* (2013.01); *H04L 1/00* (2013.01); *H04L 1/1671* (2013.01); *H04L 5/0094* (2013.01)

(58) Field of Classification Search
CPC ....... H04L 5/0053; H04L 1/08; H04L 5/0012; H04L 1/00; H04L 1/1671; H04L 5/0094; H04B 1/713; H04B 2201/698
See application file for complete search history.

(56) References Cited

U.S. PATENT DOCUMENTS

| 2010/0098012 A1* | 4/2010 | Bala ...................... H04W 72/21 370/329 |
|---|---|---|
| 2011/0111779 A1 | 5/2011 | Krishnamurthy et al. |
| 2012/0014349 A1 | 1/2012 | Chung et al. |
| 2013/0083753 A1 | 4/2013 | Lee et al. |

(Continued)

FOREIGN PATENT DOCUMENTS

| WO | WO-2014182009 A1 * | 11/2014 | ........... H04L 1/1854 |
|---|---|---|---|
| WO | 2016122782 A1 | 8/2016 | |

OTHER PUBLICATIONS

Lee et al., Method and Apparatus for Supporting Uplink Transmission and MBMS for a WTRU With Reduced Bandwidth (U.S. Appl. No. 62/037,739, filed Aug. 15, 2014), USPTO, whole document (Year: 2014).*

(Continued)

*Primary Examiner* — Michael Thier
*Assistant Examiner* — Jose L Perez
(74) *Attorney, Agent, or Firm* — Kowert, Hood, Munyon, Rankin & Goetzel, P.C.

(57) ABSTRACT

This application relates to enhanced coverage communication using a physical uplink control channel (PUCCH). PUCCH puncturing may be performed in relation to frequency hopping.

20 Claims, 5 Drawing Sheets

(56) References Cited

U.S. PATENT DOCUMENTS

| | | | |
|---|---|---|---|
| 2013/0195041 A1 | 8/2013 | Papasakellariou et al. | |
| 2013/0322363 A1 | 12/2013 | Chen et al. | |
| 2013/0343322 A1* | 12/2013 | Lee | H04L 5/0053 |
| | | | 370/329 |
| 2014/0098761 A1 | 4/2014 | Lee et al. | |
| 2014/0119331 A1 | 5/2014 | Ji et al. | |
| 2014/0126386 A1 | 5/2014 | Beale | |
| 2014/0198744 A1* | 7/2014 | Wang | H04B 7/0626 |
| | | | 370/329 |
| 2014/0362832 A1* | 12/2014 | Rudolf | H04W 72/0446 |
| | | | 370/336 |
| 2016/0088594 A1* | 3/2016 | Xiong | H04L 5/0007 |
| | | | 370/329 |
| 2016/0100401 A1* | 4/2016 | Xiong | H04W 16/14 |
| | | | 455/450 |
| 2016/0128029 A1* | 5/2016 | Yang | H04W 48/16 |
| | | | 370/329 |
| 2016/0135170 A1* | 5/2016 | Chen | H04W 72/0446 |
| | | | 370/336 |
| 2016/0182199 A1* | 6/2016 | Webb | H04L 5/0051 |
| | | | 370/329 |
| 2016/0234859 A1* | 8/2016 | You | H04W 72/1289 |
| 2016/0242169 A1 | 8/2016 | Park et al. | |
| 2016/0249355 A1* | 8/2016 | Chae | H04W 72/1289 |
| 2016/0337086 A1 | 11/2016 | Shen et al. | |
| 2016/0353440 A1 | 12/2016 | Lee et al. | |
| 2017/0055249 A1 | 2/2017 | Yasukawa et al. | |
| 2017/0245265 A1 | 8/2017 | Hwang et al. | |
| 2017/0245313 A1* | 8/2017 | Kim | H04L 1/1671 |
| 2017/0295005 A1 | 10/2017 | Lee et al. | |
| 2017/0295570 A1 | 10/2017 | Awad et al. | |
| 2017/0374675 A1 | 12/2017 | Hwang et al. | |

OTHER PUBLICATIONS

Hwang et al., PUSCH Transmission With High Reference Signal Density (U.S. Appl. No. 62/093,399, filed Dec. 17, 2014), USPTO, whole document (Year: 2014).*

Noh et al., Method for transmitting and receiving response signal and apparatus therefor (Google Patents translation of WO 2014/182009 A1), Google Patents, Nov. 2014, whole document (Year: 2014).*

3GPP, TS 36.212 (3rd Generation Partnership Project; Technical Specification Group Radio Access Network; Evolved Universal Terrestrial Radio Access (E-UTRA); Multiplexing and channel coding (Release 12)), Dec. 2014, pp. 6, 34 (Year: 2014).

Alcatel-Lucent et al., Coverage enhancement for physical data & control channels, R1-144697, 3GPP TSG RAN WG1 Meeting #79, Nov. 8, 2014, whole document (Year: 2014).

Hwang et al., U.S. Appl. No. 62/109,076 (PUSCH Transmission With High Reference Signal Density), filed Jan. 15, 2015, pp. 19-20 (Year: 2015).

Nec, PUCCH for Rel-13 Low complexity MTC, R1-144862, 3GPP TSG RAN WG1 Meeting #79, Nov. 8, 2014, whole document.

MediaTek, Discussion on PUCCH for Rel-13 MTC UE, R1-144853, 3GPP TSG RAN WG1 Meeting #79, Nov. 8, 2014, whole document.

"European Application Serial No. 15880641.4, Extended European Search Report dated Aug. 2, 2018", 11 pgs.

"International Application Serial No. PCT/US2015/064763, International Preliminary Report on Patentability dated Aug. 10, 2017", 10 pgs.

"International Application Serial No. PCT/US2015/064763, International Search Report dated Mar. 28, 2016", 3 pgs.

"International Application Serial No. PCT/US2015/064763, Written Opinion dated Mar. 28, 2016", 8 pgs.

* cited by examiner

SYSTEM AND METHODS FOR SUPPORT OF FREQUENCY HOPPING FOR UES WITH REDUCED BANDWIDTH SUPPORT

PRIORITY CLAIM

This application is a continuation of and claims the benefit of priority to U.S. patent application Ser. No. 14/748,814, filed Jun. 24, 2015, and entitled "SYSTEMS AND METHODS FOR SUPPORT OF FREQUENCY HOPPING FOR UES WITH REDUCED BANDWIDTH SUPPORT", which claims the benefit of priority to U.S. Provisional Patent Application Ser. No. 62/109,382, filed Jan. 29, 2015, and entitled "SYSTEM AND METHODS FOR SUPPORT OF FREQUENCY HOPPING FOR UES WITH REDUCED BANDWIDTH SUPPORT," and U.S. Provisional Patent Application Ser. No. 62/158,199, filed May 7, 2015, and entitled "SYSTEM AND METHODS FOR SUPPORT OF FREQUENCY HOPPING FOR UES WITH REDUCED BANDWIDTH SUPPORT," each of which is incorporated herein by reference in its entirety.

TECHNICAL FIELD

Embodiments pertain to radio access networks. Some embodiments relate to frequency hopping mechanisms in cellular networks, including Third Generation Partnership Project Long Term Evolution (3GPP LTE) networks and LTE advanced (LTE-A) networks as well as 4th generation (4G) networks and $5^{th}$ generation (5G) networks.

BACKGROUND

With the increase in different types of devices communicating over networks to servers and other computing devices, usage of 3GPP LTE systems has increased. In particular, both typical user equipment (UE) such as cell phones and Machine Type Communications (MTC) UEs currently use 3GPP LTE system. MTC UEs pose a particular challenge as they are less computationally powerful and have less power for communication. Moreover, many MTC UEs are configured to remain essentially indefinitely in a single location. Examples of such MTC UEs include smart meters or sensors (e.g., sensing environmental conditions) or microcontrollers in appliances or vending machines.

Unfortunately, in a number of cases, MTC UEs do not have sufficient power for communications with the nearest serving base station (enhanced Node B (eNB)). Similar problems arise for non-stationary wireless UEs, such as mobile phones, that are disposed in a network area with poor coverage, i.e., one in which the link budget is several dB below typical network values. Transmission power may not be able to be increased either by a UE or eNB in situations in which UEs are in such areas. To achieve a particular coverage extension target and obtain additional dB in link budget, signals may be repeatedly transmitted to or from a UE in an enhanced coverage mode over an extended period to accumulate energy at the receiving device or eNB respectively.

Furthermore, to reduce the cost and power consumption of various devices, the transmission bandwidth for MTC UEs may be reduced. Since transmissions using a large number of repetitions increase the device power consumption as well as decrease system-level resource utilization and spectral efficiency, additional techniques to improve the link budget like frequency hopping mechanisms may be used to reduce the number of repetitions for reduced bandwidth UEs and UEs in enhanced coverage mode.

BRIEF DESCRIPTION WIRE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
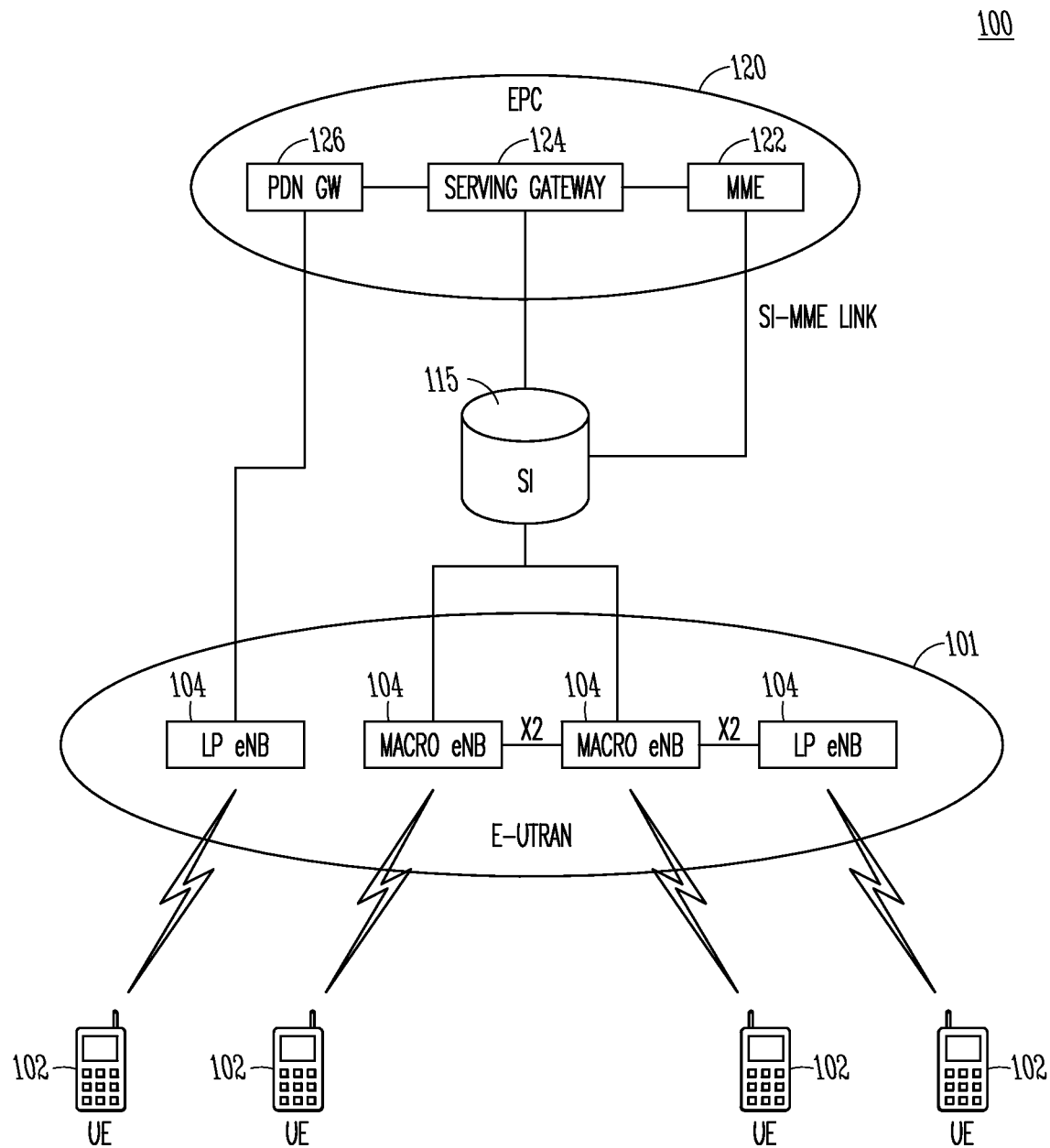
FIG. 1 is a functional diagram of a 3GPP network in accordance with some embodiments.

FIG. 1 is a functional diagram of a 3GPP network in accordance with some embodiments. The network may comprise a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-Bs (eNBs) 104 (which may operate as base stations) for communicating with UE 102. The eNBs 104 may include macro eNBs and low power (LP) eNBs.

The MME, is similar in function to the control plane of legacy Serving GPRS Support Nodes (SGSN). The MITE manages mobility aspects in access such as gateway selection and tracking area list management. The serving GW 124 terminates the interface toward the RAN 100, and routes traffic packets (such as data packets or voice packets) between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes traffic packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. The eNBs 104 may communicate both with UEs 102 in a normal coverage mode and UEs 104 in one or more enhanced coverage modes. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with embodiments, UEs 102 may be configured to communicate OFDM communication signals with an eNB 104 over a multicarrier communication channel in accordance with an OFDMA communication technique. The OFDM (or SC-FDMA) signals may comprise a plurality of orthogonal subcarriers. Other technologies may also be used, such as Non-Orthogonal Multiple Access (NOMA), Code Division Multiple Access (CDMA), and Orthogonal Frequency-Division Multiple Access (OFDMA).

The S1 interface 115 is the interface that separates the RAN 100 and the EPC 120. It is split into two parts: the S1-U, which carries traffic packets between the eNBs 104 and the serving GW 124, and the S1-MME, which is a signaling interface between the eNBs 104 and the MME 122.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. The eNB may schedule uplink and downlink transmissions over a variety of frequency bands. The allocation of resources in subframes used in one frequency band and may differ from those in another frequency band. Each slot of the subframe may contain 6-7 symbols, depending on the system used. In some embodiments, the subframe may contain 12 or 24 subcarriers. A resource grid may be used for downlink and uplink transmissions between an eNB and a UE The resource grid may be a time-frequency grid, which is the physical resource in each slot. The smallest time frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE in the current 3GPP standard. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. The duration of the resource grid in the time domain corresponds to one subframe or two resource blocks. Each resource grid may comprise 12 (subcarriers)*14(symbols)=168 resource elements for normal cyclic prefix (CP) case. Several different physical channels may be conveyed using such resource blocks.

Figure 2:
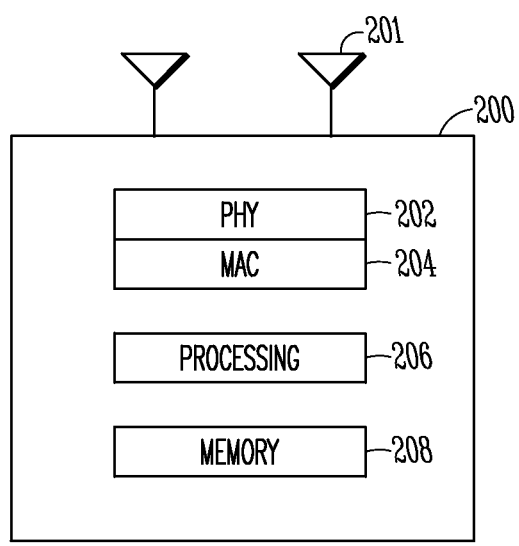
FIG. 2 is a block diagram of a 3GPP device in accordance with some embodiments.

FIG. 2 is a functional diagram of a 3GPP device in accordance with some embodiments. The device may be a UE or eNB, for example. In some embodiments, the eNB may be a stationary non-mobile device. The 3GPP device 200 may include physical layer circuitry 202 for transmitting and receiving signals using one or more antennas 201. The 3GPP device 200 may also include medium access control layer (MAC) circuitry 204 for controlling access to the wireless medium. The 3GPP device 200 may also include processing circuitry 206 and memory 208 arranged to perform the operations described herein.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201 may comprise one or more directional or omnidirectional antennas, including, for example, dipole antennas, monopole antennas, patch antennas, loop antennas, microstrip antennas or other types of antennas suitable for transmission of RF signals, in some multiple-input multiple-output (MIMO) embodiments, the antennas 201 may be effectively separated to take advantage of spatial diversity and the different channel characteristics that may result.

Although the 3GPP device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPPP device 200 and that cause it to perform any one or more of the techniques of the present disclosure, or that is capable of storing, encoding or carrying data structures used by or associated with such instructions. The term "transmission medium" shall be taken to include any intangible medium that is capable of storing, encoding or carrying instructions for execution, and includes digital or analog communications signals or other intangible medium to facilitate communication of such software.

As described above, there are a number of different types of UEs that may use an enhanced coverage mode. These UEs may include a legacy UE (e.g., a smartphone or one supporting Human-Type Communication (HCT)) or a MTC UE, such as a stationary UE in a smart meter that ma be installed in the basement of a building (i.e., a UE that remains indefinitely in a single location). The UE may enter an enhanced coverage mode when situated in locations in which the link budget to the nearest serving base station is worse than a typical link budget value in the network and additional link budget is to be obtained without increasing transmission power. As used herein, the term "legacy UE" is used to refer to a legacy UE in normal mode.

To increase signal power at the receiver without increasing the transmission power, the same packet data may be repeatedly transmitted by the transmitter. The transmitter may be either of the UE (uplink communications) or eNB (downlink communications), while the receiver may be the other of the UE (downlink communications) or eNB (uplink communications). Depending on the physical channel under consideration, the UE or the eNB may determine whether additional link budget is desired, as well as how much additional link budget is desired. In some embodiments, the additional link budget may include multiple discrete levels, e.g., up to about 5 dB, up to about 10 dB, up to about 15 dB and up to about 20 dB. In response to determining how much additional link budget is desired, the UE may implement different enhanced coverage mode levels. In some embodiments, different enhanced coverage mode levels may be available dependent on the desired amount of additional link budget.

As different amounts of additional link budget may be desired, the different enhanced coverage modes may correspond to different sets of resource regions. The different sets of resource regions may be separated temporally (e.g., in different slots) to provide different amounts of repetition of the same (control or data) signal. In one example, to obtain the link budget, packets transmitted between the UE and eNB may be repeated a large number (>100) of times. By permitting the repetition level for each physical channel transmission to be UE specific depending on the desired enhanced coverage level, excessive radio resource waste and unnecessary UE power consumption may be avoided.

The operating bandwidth of UEs may also be reduced, e.g., to the current minimum bandwidth supported by LTE (1.4 MHz), for both uplink and downlink control and data channels. This may permit a resource region of limited resources (e.g., in frequency) to be used in communications between the UEs and the eNB. Such a region may be referred to herein as an MTC region. The number of downlink and uplink MTC regions may be independently configured. As described in more detail below, frequency hopping techniques may be used to provide either or both downlink and uplink diversity gains for UEs, depending on the available system bandwidth.

Independent of the operating bandwidth, there may be several different physical channels that are conveyed using resource blocks. These physical channels may include a physical downlink control channel for MTC (M-PDCCH) and physical downlink shared channel (PDSCH) in a downlink transmission and a physical uplink control channel (PUCCH) and physical uplink shared channel (PUSCH) in an uplink transmission. Each subframe may be partitioned into the PDCCH and PDSCH or PUCCH and PUSCH with the control and shared channels for UL and DL being multiplexed in frequency. The M-PDCCH may be based on the Enhanced PDCCH (EPDCCH) design and carry, among other things, information about the transport format and resource allocations related to the PDSCH or PUSCH as well as H-ARQ information related to the uplink or downlink shared channel. The PDSCH may carry user data and higher layer signaling to a UE or eNB and occupy the remainder of the subframe. The PUSCH may be shared by UEs to transmit data to the network. The scheduling is controlled by the eNB. Typically, downlink scheduling (assigning control and shared channel resource blocks to UEs within a cell) may be performed at the eNB based on channel quality information provided from the UEs to the eNB, and then the downlink resource assignment information may be sent to each UE on the M-PDCCH used for the UE. The M-PDCCH may contain downlink control information (DCI) in one of a number of formats that tell the UE how to find and decode data, transmitted on PDSCH in the same or a subsequent subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a particular Radio Network Temporary Identifier (RNTI), Cell-RNTI, Paging-RNTI, RA-RNTI, etc., that identifies the target UE for which the PDSCH is intended. Use of the UE-specific RNTI may limit decoding of the DCI format (and hence the corresponding PDSCH) to only the intended UE.

The PUCCH may carry information including Uplink Control Information (UCI), similar to the DCI of the PDCCH. The PUCCH may be mapped to a control channel resource defined by a code and two resource blocks, consecutive in time, with hopping potentially at the boundary between adjacent slots. The PUCCH may take several different formats, with the UCI containing information dependent on the format. Specifically, the PUCCH may contain a scheduling request (SR), acknowledgement responses/retransmission requests (ACK/NACK) or a Channel Quality Indication (CQI)/Channel State information (CSI). The CQI/CSI may indicate the current channel conditions and, if MIMO transmission is used by the UE, may include MIMO-related feedback.

Figure 3A:
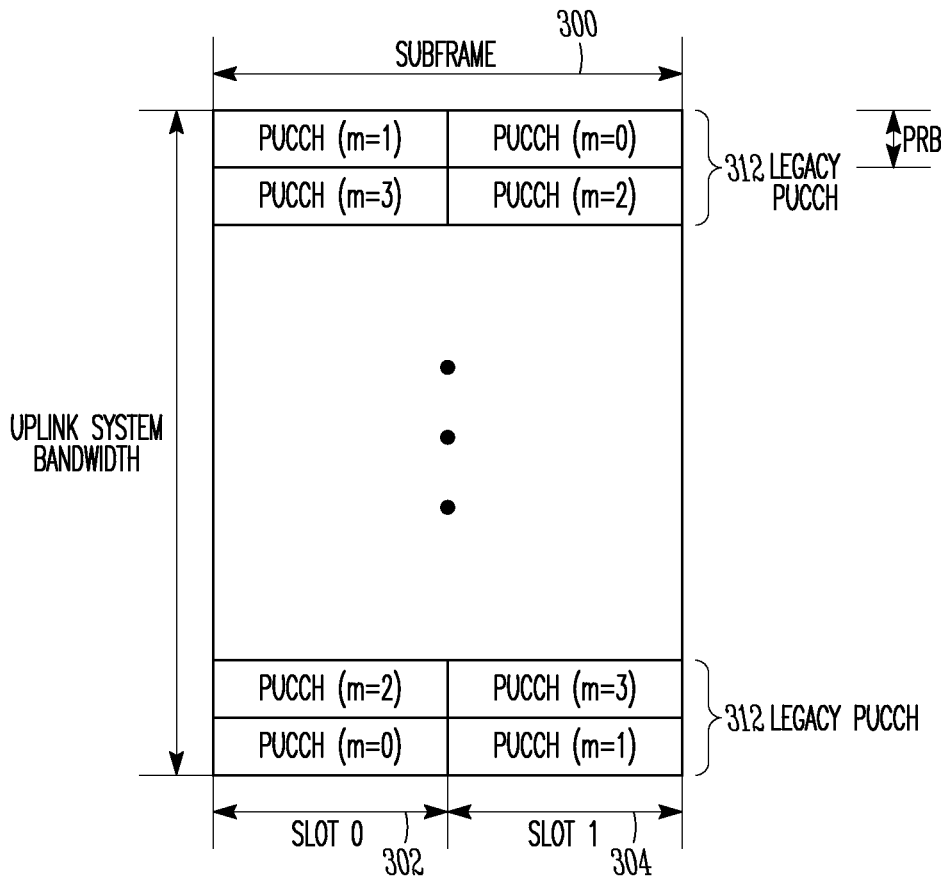
FIGS. 3A and 3B illustrate PUCCH regions in accordance with some embodiments
Figure 3B:
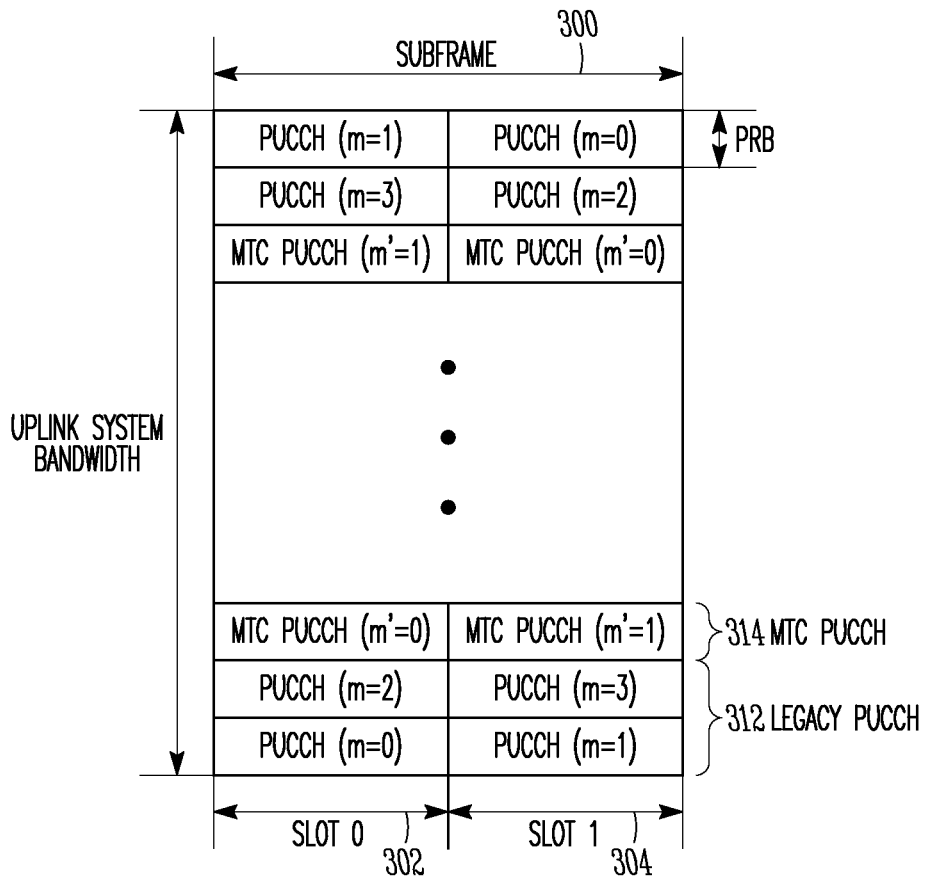

FIGS. 3A and 3B illustrate PUCCH regions in accordance with some embodiments. In some embodiments, the MTC UEs may be in enhanced mode. In some embodiments, the MTC UEs frequency hop. FIG. 3A shows PUCCH regions in which UEs (legacy UEs) and MTC UEs share PUCCH regions that have been allocated by the eNB. Although MTC UEs are specifically referred to, the descriptions herein may also apply to legacy UEs in enhanced mode. FIG. 3A shows a subframe 300 containing slot 0 302 and slot 1 304 in which intra-subframe (inter-slot) PUCCH frequency hopping across the entire system bandwidth, which in some embodiments may be 20 MHz, is shown (in other embodiments, the system bandwidth be 1.4 MHz, 3 MHz, 5 MHz, 10 MHz or 15 MHz). As it can take a UE about 5 μs to retune the transceiver from one narrowband region to another within the uplink system bandwidth, inter-slot frequency hopping may be possible for various types of UEs. Although not shown, inter-subframe PUCCH frequency hopping may be present in addition to the intra-subframe frequency hopping shown. The subframe 300 may contain legacy PUCCH regions 312 in resource blocks at the edges of the uplink bandwidth. The legacy PUCCH regions 312 may take up any number of resource blocks adjacent to the edges of the uplink bandwidth, dependent on the number of physical resource blocks that the eNB determines is desired to reserve for UEs being served by the eNB. As above, the physical resource blocks may be 180 kHz, leading to from 6 physical resource blocks in a system bandwidth of 1.4 MHz to 100 physical resource blocks in a system bandwidth of 20 MHz. In the embodiment shown in FIG. 3A, the legacy PUCCH regions 312 are transmitted in the two resource blocks adjacent to the edges of the uplink bandwidth.

in some embodiments, frequency hopping occurs to maximize frequency diversity by frequency hopping from one edge of the uplink bandwidth in one of the slots 302, 304 to the opposite edge of the system bandwidth in the other of the slots 302, 304 while retaining a contiguous temporal resource allocation. In other words, the same UE may have a contiguous resource allocation of different physical resource blocks among the slots 302, 304 while the same physical resource block may be contiguously allocated to different UEs between the slots 302, 304. In FIG. 3A, the m index denotes the time and frequency resource used for PUCCH transmission as well as code resource for multiplexing. Thus, as shown, the frequency hopping is symmetric around the central uplink carrier frequency of the uplink system bandwidth, with the UEs (whether legacy or MTC) in the first and last physical resource block in the bandwidth swapping physical resource blocks between slot 0 302 and slot 1 304 and the UEs in the second and next to last physical resource block in the bandwidth swapping physical resource blocks between slot 0 302 and slot 1 304.

In some embodiments, the legacy PUCCH regions 312 of FIG. 3A may be shared between legacy UEs and MTC UEs with reduced bandwidth support. Thus, the physical resource blocks adjacent to the edges of the uplink bandwidth may vary temporally between legacy UEs and MTC UEs. The physical resource block (and coding) used may be altered dynamically by changing the control channel element (CCE) or enhanced control channel element ECCE in the PDSCH or adjusting a UE-specific starting subframe offset value. To avoid the PUCCH physical resource collision between the legacy UE and MTC UEs, the starting subframe offset $N_{PUCCH}^{(1)}$ may be configured for the MTC UEs via UE-specific dedicated Radio Physical resource Control (RRC) signaling. Note that for legacy UEs, the starting subframe offset may be 0, while for MTC UEs the offset shown in FIG. 3B may be 3 or more. This embodiment reuses existing signaling, so changes to the current 3GPP standard may be avoided. In some embodiments, as indicated below, a new parameter may be added to the signaling, in which the new parameter defines the starting subframe offset from the end of legacy PUCCH region. In some embodiments, the new parameter may be slot dependent rather than subframe dependent. The RRC signaling used to convey the parameters may be transmitted when the UE is in an RRC connected mode.

In some embodiments, as shown in FIG. 3B, rather than the legacy PUCCH regions being shared among the UEs and the MTC UEs, separate MTC PUCCH regions may be defined adjacent or near (i.e., within a few physical resource blocks) to the legacy PUCCH regions, close to the system bandwidth edge. This may reduce wasted physical resource blocks between the PUCCH regions, which are unable to be used by the system for other functions, as well as maximizing frequency diversity. The legacy and MTC PUCCH regions may be allocated by the eNB and the resources identified in the UE. The MTC PUCCH regions may not be adjacent to the system bandwidth edge as that is where the legacy PUCCH regions are disposed—i.e., the eNB may avoid allocating MTC PUCCH resources in physical resource blocks adjacent to the system bandwidth edge. The use of MTC PUCCH regions may minimize the impact on legacy LTE systems, in particular when a large number of MTC UE devices are to be supported by the serving cell. In some embodiments, the legacy and MTC PUCCH regions may be exclusive or reserved for the specific type of UE i.e., only legacy UEs may be allocated physical resource blocks in the legacy PUCCH and only MTC UEs may be allocated physical resource blocks in the MTC PUCCH (and, as described below, only MTC EC UEs may be allocated physical resource blocks in the MTC EC PUCCH).

As shown in FIG. 3B, the MTC PUCCH region 314, along with the legacy PUCCH regions 312, use inter-slot frequency hopping. Similar to the legacy parameter $N_{RB}^{PUCCH}$, which may be used to indicate the number of physical resource blocks for legacy PUCCH transmissions within a particular slot, an MTC parameter $N_{RB}^{PUCCH-MTC}$ may be specified for MTC UEs to indicate the number of physical resource blocks allocated for the MTC PUCCH region within the particular slot. Both the legacy and MTC parameter may be signaled by higher layer control signaling, via the master information block (MIB), an existing or new system information block (SIB) or, as above, UE-specific dedicated RRC signaling.

In some embodiments, frequency hopping occurs to maximize frequency diversity (about a 2 dB gain) by symmetrical (or mirrored) inter-slot frequency hopping isolated to the type of PUCCH region, legacy or MTC. That is, in FIG. 3B, the legacy UEs frequency hop between physical resource blocks associated with legacy PUCCH regions but not between physical resource blocks associated with MTC PUCCH regions and the MTC UEs frequency hop between physical resource blocks associated with MTC PUCCH regions but not between physical resource blocks associated with legacy PUCCH regions. Moreover, the assignment of a physical resource block within a subframe also remains constant with respect to the type of PUCCH region, independent of which type of MTC is assigned to the physical resource block. Thus, the relative locations of the legacy PUCCH regions and MTC PUCCH regions within the bandwidth remain constant within the subframe.

In some embodiments, rather than being symmetric, the MTC PUCCH region in FIG. 3B may be configured using MTC PUCCH starting offsets. As above, in some embodiments, a single subframe starting offset may be transmitted by the eNB. In other embodiments, two MTC PUCCH starting offsets, $N_{PUCCH\_MTC\_slot0}^{(1)}$ and $N_{PUCCH\_MTC\_slot1}^{(1)}$ may be used to configure the MTC PUCCH regions. As indicated, these offsets may be slot starting offsets and may be independent of each other. In other embodiments, more than two MTC PUCCH regions may be present, with each MTC PUCCH region being configured using an associated pair of MTC PUCCH starting offset $N_{PUCCH\_MTC\_slot0}^{(1)}$ and $N_{PUCCH\_MTC\_slot1}^{(1)}$. The MTC PUCCH regions may be configured in a cell- or UE-specific manner (e.g., via SIB or RRC control signaling) on a per-slot basis considering inter-slot frequency hopping. This provides additional flexibility in scheduling resource allocation by permitting the MTC PUCCH regions in each slot to be scheduled independently rather than having the mirrored hopping design shown in FIGS. 3A and 3B. In such an embodiment, only one of the slots using a particular set of frequency resources associated with a particular physical resource block may be used as a MTC PUCCH region, rather than both slots of the subframe being used.

In some embodiments, similar to the above. Enhanced Coverage (EC)-MTC PUCCH regions may also be defined separately from the legacy PUCCH region to avoid collisions due to the repetitions used to build up the link budget for the EC mode MTC UE signal. In the EC-MTC PUCCH regions, resources are allocated for MTC UEs in enhanced coverage mode with the number of PUCCH repetitions configured by the eNB. However, due to the repetitions used for EC-MTC UEs, inter-slot frequency hopping may not be able to be employed to generate the desired link budget. However, inter-subframe frequency hopping may still be used, given the above constraints. The EC-MTC UEs may transmit PUCCH control signals using the same frequency resources for both slots of a particular subframe. The EC-MTC PUCCH physical resource blocks may be adjacent to the legacy PUCCH regions, similar to the MTC PUCCH regions shown in FIG. 3B, or may be disposed elsewhere within the uplink system bandwidth with sufficient separation in frequency to realize maximal possible frequency diversity.

In one example, an EC-MTC PUCCH region may comprise two sub-regions (EC-MTC PUCCH sub-region 1 and EC-MTC PUCCH sub-region 2). EC-MTC PUCCH sub-region 1 and EC-MTC PUCCH sub-region 2 may be mirror images about the central UL carrier frequency. Inter-subframe frequency hopping can be applied following a pattern such that the EC-MTC UE transmits PUCCH control signals on one edge of the system bandwidth (EC-MTC PUCCH sub-region 1) over N consecutive UL subframes and then switches to the other edge of the system bandwidth (EC-MTC PUCCH sub-region 2), with N≥1. When N>1, this may permit the eNB to combine the channel estimates corresponding to the N consecutive UL subframes corresponding to the same frequency location to improve the channel estimation performance in low SNR regimes. As above, in some embodiments. N may be explicitly configured by higher layer or dynamic signaling. In some embodiments, N may be signaled implicitly as a function of the number of configured repetitions or the enhanced coverage level, such that the number of repetitions is large enough to facilitate efficient cross-subframe channel estimation and provide a hopping rate that is fast enough to effectively realize frequency diversity benefits.

Similar to independent per-slot MTC PUCCH starting offset configuration, in some embodiments, multiple MTC PUCCH starting offsets, $N_{PUCCH\_MTC\_slot0}^{(1)}$ and $N_{PUCCH\_MTC\_slot1}^{(1)}$, may be configured in a cell- or UE-specific manner. In this case, each offset defines, rather than a subframe or slot-based offset, a different set of N subframes for inter-subframe or inter-subframe-set frequency hopping. This provides additional flexibility to schedule physical resource allocation independently for each set of N subframes. In such embodiments, the frequency hopping may or may not be symmetrical.

In some embodiments, it may take the UE an extended amount of time to retune the transceiver from one narrowband region to another within the uplink system bandwidth rather than the above 5 µs. For example, the retuning time may be on the order of the duration of a symbol (about 67 µs), being greater than the cyclic prefix (CP). To support frequency hopping in this case, the switching time may not be able to be ignored, in particular for MTC UEs with reduced bandwidth support. This may limit or otherwise restrain slot-level frequency hopping from occurring due to the loss of too many symbols. Inter-subframe frequency hopping may still be used, in some embodiments leaving a, subframe gap between tuning to the different frequencies.

In some embodiments in which retuning time has become an issue, a shortened PUCCH may be defined for PUCCH formats 1, 1A or 1B at the slot-level with a length-3 Orthogonal Cover Code (OCC) used for mapping reference signal defined by a cyclic shift value and the OCC. The number of bits in the OCC in this case may be reduced from 4 to 3, i.e., $N_{SF}^{PUCCH}=3$ instead of $N_{SF}^{PUCCH}=4$ for regular PUCCH formats, such that the OCC spans one fewer symbol in a given slot. This permits an extended switching time to occur for both slot- and subframe-level frequency hopping. The extended switching time can be accommodated either at the end of the first slot in a given subframe or at the beginning of the second slot in the subframe. Accordingly, the last symbol of the first slot or the first symbol of the second slot of a subframe may be punctured as defined in 3GPP TS36.212 Section 5.2.2.6.

In some embodiments in which slot-level frequency hopping occurs beyond an MTC narrowband frequency region, a transmission on a shortened PUCCH may be used for either or both slot 0 and slot 1 of a particular subframe for enhanced coverage mode UEs. As above, shortening the PUCCH may enable an enhanced coverage mode UE to accommodate an increased retuning time, thereby enabling support of inter-subframe frequency hopping at the subframe boundary. Accordingly, in embodiments in which the PUCCH in both slots is shortened, the last symbol of each slot of a particular subframe may be punctured and the shortened PUCCH used for both slots. Alternatively, the first symbol of each slot of the particular subframe may be punctured and shortened PUCCH used for both slots. The use of a shortened PUCCH may be specified by the eNB when an EC mode PUCCH is to be transmitted, or a shortened PUCCH may be used for normal coverage mode UEs.

In some embodiments in which slot-level frequency hopping is disabled, the same physical resource blocks may be used for both slots of a particular subframe. As above, frequency hopping may be applied every N subframes, where N is an integer greater than 0. For enhanced coverage support, a shortened PUCCH may be used for slot 1 of the subframe, with the last symbol of slot 1 being punctured at the frequency hopping boundary. This accommodates an extended retuning time for support of inter-subframe frequency hopping at the subframe boundary. In one embodiment, all transmissions on the PUCCH resources may use a shortened PUCCH. In this case, the inter-subframe frequency hopping pattern may be cell-specific (i.e., dependent on the eNB). In some embodiments, the shortened PUCCH may be defined to assume puncturing of the first symbol of slot 0 of the subframe.

If a subframe in which a shortened PUCCH in slot 1 coincides with cell- or UE-specific sounding reference signal (SRS) transmission occasions, the SRS transmission in the affected subframe may be dropped by the affected MTC UE. This may occur whether the SRS is a periodic or aperiodic SRS transmission when the UE is to retune to a different set of frequencies (e.g., frequency hop) within the system bandwidth for the immediately following subframe if scheduled to transmit the SRS in the subframe. The MTC UE may determine whether to drop the SRS or may be instructed by the eNB to drop the SRS.

Although the above embodiments have described frequency hopping for transmissions using PUCCH resources, similar concepts may be applied to PUSCH transmissions. In particular, frequency hopping may be used for PUSCH transmissions by UEs in enhanced coverage mode. In one such embodiment, the UE may avoid transmitting PUSCH information on the last symbol of the subframe to accommodate extended switching time for the UE to retune to a different set of frequencies within the system bandwidth. This may be defined similar to the multiplexing of PUSCH and SRS signals within a subframe, as defined in the current LTE specifications. Limitations on PUSCH transmissions by the UE may be provided by the eNB using control signaling, such as the RRC signaling or SIB or MIB.

In some embodiments, the parameter $N_{symb}^{PUSCH}$ may be defined as $N_{symb}^{PUSCG}=(2 \cdot (N_{symb}^{UL}-1)-N_X)$ where $N_X=N_{SRS}+N_{MTC\_retTime}$. Here, $N_{SRS}=1$ for subframes with SRS transmissions as described in 3GPP TS36.212 Section 5.2.2.6, and $N_{SRS}=0$ otherwise. Similarly, $N_{MTC\_retTime}=1$ for a subframe if a MTC UE with reduced bandwidth support is to retune to a different set of frequencies within the larger system bandwidth for the immediately following uplink subframe and if $N_{SRS}=0$ for that subframe $N_{MTC\_retTime}=0$ otherwise. In other embodiments, $N_X=1$ for MTC UEs with reduced bandwidth support. If the subframe coincides with cell- or UE-specific SRS transmission occasions, the SRS transmission in the affected subframe may be dropped by the affected MTC UE.

The various embodiments described herein provide PUCCH resource allocation in a number of different constructions. PUCCH resource allocation and frequency hopping is provided both for UEs with reduced bandwidth support and for UEs in an enhanced coverage mode. In addition, the various embodiments herein describe physical structures for a PUCCH to handle retuning time for MTC Lips with reduced bandwidth support to support slot- or subframe-level frequency hopping and to support frequency hopping for repeated PUSCH transmissions.

Figure 4:
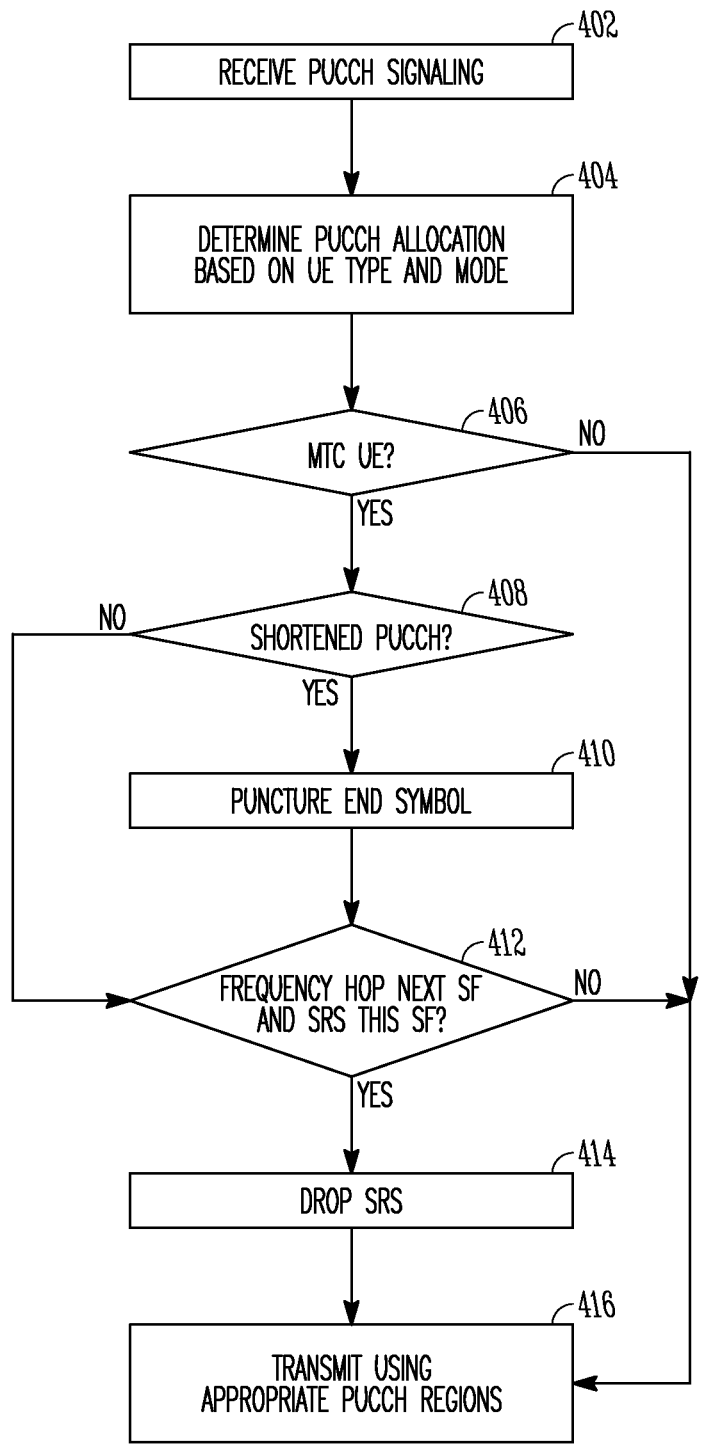
FIG. 4 illustrates a flowchart of a method of transmitting using a non-legacy PUCCH region in accordance with some embodiments.

FIG. 4 illustrates a flowchart of a method of transmitting using a non-legacy PUCCH region in accordance with some embodiments. In operation 402, the UE may receive PUCCH signaling from the eNB. The PUCCH signaling may indicate whether or not frequency hopping is to be used as well as the type of frequency hopping (inter-subframe or inter-slot), the number of consecutive subframes before frequency hopping if the UE is in enhanced coverage mode, the number of physical resource blocks allocated for the legacy/MTC PUCCH region within the particular slot, one or more UE-specific starting subframe offsets on a per-slot or subframe set basis, and whether a shortened PUCCH is to be used. Both the legacy and MTC parameters may be signaled by higher layer control signaling, via cell-specific signaling such as the master information block (MIB) or an existing or new system information block (SIB) or UE-specific dedicated RRC signaling.

In operation 404, the UE may determine the PUCCH allocation. The PUCCH allocation may be based on whether the UE is a legacy UE or an MTC UE, as well as whether the UE is in enhanced coverage mode. The PUCCH allocation may comprise PUCCH resources for frequency hopping. The frequency hopping may be intra-subframe (inter-slot) or inter-subframe. Legacy or MTC frequency hopping may be symmetric around the central uplink carrier frequency of the uplink system bandwidth, with the MTC UEs in the first and last physical resource block in the bandwidth swapping physical resource blocks between the slots. The system bandwidth may be 20 MHz.

In operation 406, the method splits depending on whether the UE is an MTC UE or a legacy UE. If the UE is a legacy UE, at operation 416 the UE may transmit in a legacy PUCCH region using legacy PUCCH resources determined at operation 404 based on the PUCCH signaling received at operation 402. Legacy PUCCH may be transmitted in legacy PUCCH regions in the resource blocks adjacent to the edges of the uplink bandwidth. The allocated legacy resources may include PUCCH resources in which frequency hopping is to take place or in which a shortened. PUCCH format is to be used.

If the UE is an MTC UE, at operation 408, the UE may determine whether a shortened PUCCH is to be used during transmission. Whether a shortened PUCCH is to be used may be based on the PUCCH signaling received at operation 402. In particular, the OCC may be reduced to accommodate an extended switching time.

In response to determining that a shortened PUCCH is to be used during transmission, the UE may puncture an end symbol at operation 410. The end symbol may be the first or last symbol. In particular, the last symbol of the first slot or the first symbol of the second slot of a subframe may be punctured. For enhanced coverage mode MTC UEs, either the first or last symbol of each slot may be punctured.

If, at operation 408, the UE determines that a shortened PUCCH is not to be used during transmission, or after puncturing the end symbol at operation 410, the UE may determine at operation 412 whether it is to frequency hop during the next subframe and, if so, whether an SRS signal is scheduled to be transmitted by the UE.

If the UE determines at operation 412 that it is to frequency hop during the next subframe and an SRS is scheduled to be transmitted by the UE, the UE may at operation 414 drop the SRS. This may occur whether the SRS is a periodic or aperiodic SRS transmission.

If the UE determines at operation 412 either that it is not to frequency hop during the next subframe or that an SRS is not scheduled to be transmitted, or, after dropping the SRS in operation 414, at operation 416 the UE may transmit on either shared legacy PUCCH regions as indicated in the PUCCH signaling or entirely separate MTC PUCCH regions adjacent or near to the legacy PUCCH regions. In the event that the MTC UE is in enhanced coverage mode, separate EC MTC PUCCH regions adjacent to the legacy PUCCH regions may be allocated without inter-slot frequency hopping.

Various examples of the disclosure are provided below. These examples are not intended to in any way limit the disclosure herein. In Example 1, a UE may comprise a transceiver configured to transmit signals to an enhanced Node B (eNB) in a network having a system bandwidth; and processing circuitry configured for configure the UE to be in one of a normal mode and an enhanced coverage (EC) mode at least one of based on downlink measurements or based on instructions received from the eNB; configure the transceiver to receive a resource allocation for a physical uplink control channel (PUCCH) in a PUCCH region separate from a legacy PUCCH region, the legacy PUCCH region comprising physical resource blocks (PRBs) adjacent to edges of the system bandwidth in at least one of a first and second slot of a subframe, the PUCCH region comprising PRBs reserved for non-legacy UEs; and configure the transceiver to transmit a PUCCH in the PUCCH region.

In Example 2, the subject matter of Example 1 can optionally include that the PUCCH region comprises PRBs that are symmetric around a center frequency of the uplink system bandwidth In Example 3, the subject matter of one or any combination of Examples 1-2 can optionally include that the processing circuitry is further configured to apply inter-slot frequency hopping between the symmetric PRBs.

In Example 4, the subject matter of one or any combination of Examples 1-3 can optionally include that the processing circuitry is further configured to configure the transceiver to receive higher layer signaling indicating a number of PRBs comprising the PUCCH region and a PRB offset of the PUCCH region for the UE.

In Example 5, the subject matter of one or any combination of Examples 1-4 can optionally include that the processing circuitry is further configured to the higher layer signaling indicates a starting offset of a PUCCH for the UE configured in a cell- or UE-specific manner, and with use of mirrored hopping pattern about the center frequency of the uplink system bandwidth for inter-slot frequency hopping.

In Example 6, the subject matter of one or any combination of Examples 1-5 can optionally include that the processing circuitry is further configured to the higher layer signaling indicates starting offsets of a PUCCH for the UE, $N_{PUCCH\_MTC\_slot0}^{(1)}$ and $N_{PUCCH\_MTC\_slot1}^{(1)}$, the starting offsets configured in a cell- or UE-specific manner and on a per-slot basis.

In Example 7, the subject matter of one or any combination of Examples 1-6 can optionally include that the UE is configured to be in enhanced coverage mode, and the PUCCH region is reserved for UEs in the enhanced coverage mode and separate from the legacy PUCCH region.

In Example 8, the subject matter of one or any combination of Examples 1-7 can optionally include that the processing circuitry is further configured to configure the transceiver to apply inter-subframe frequency hopping between the PRBs every N subframes, wherein the value of N is greater than or equal to 1 and is configured by one of: higher layer or dynamic signaling, or intrinsically as a function of a number of configured repetitions or a coverage enhancement level.

In Example 9, the subject matter of one or any combination of Examples 1-8 can optionally include that the higher layer signaling indicates a starting offset of a PUCCH for the UE configured in a cell- or UE-specific manner, and with use of a mirrored hopping pattern about a center frequency of the uplink system bandwidth for inter-N-subframe frequency hopping.

In Example 10, the subject matter of one or any combination of Examples 1-9 can optionally include that the processing circuitry is further configured to the higher layer signaling indicates starting offsets of a PUCCH for the UE, $N_{PUCCH\_MTC\_slot0}^{(1)}$ and $N_{PUCCH\_MTC\_slot1}^{(1)}$, the starting offsets configured in a cell- or UE-specific manner, with one offset for each set of N subframes.

In Example 11, the subject matter of one or any combination of Examples 1-10 can optionally include that the UE is a Machine Type Communications (MTC) UE having reduced bandwidth support such that the MTC UE with reduced bandwidth support is restricted to communicate with the eNB over a limited set of subcarriers of the system bandwidth; and the PUCCH region is reserved for MTC UEs with reduced bandwidth support.

In Example 12, the subject matter of one or any combination of Examples 1-11 can optionally include that the resource allocation comprises a shortened PUCCH format configured to accommodate retuning time for MTC UEs with reduced bandwidth support.

In Example 13, the subject matter of one or any combination of Examples 1-12 can optionally include that the shortened PUCCH format comprises a length-3 Orthogonal Cover Code (OCC) in the at least one of the first and second slot of the subframe, and the processing circuitry is further configured to puncture at least one of a first and last symbol of at least one of the first and second slot.

In Example 14, the subject matter of one or any combination of Examples 1-13 can optionally include that the UE is configured to be in enhanced coverage mode and to use PUCCH repetitions, the shortened PUCCH format comprises a length-3 OCC in each of the first and second slot of the subframe, and the processing circuitry is further configured to puncture the first or last symbol of each of the first slot and second slot.

In Example 15, the subject matter of one or any combination of Examples 1-14 can optionally include that the UE is configured to be in an enhanced coverage mode and to use PUCCH repetitions and inter-subframe frequency hopping every N subframes with the resource allocation comprises a gap of 1 subframe at a boundary of frequency hopping from one PRB location to another to accommodate retuning time for MTC UEs with reduced bandwidth support.

In Example 16, the subject matter of one or any combination of Examples 1-15 can optionally include that the UE is configured to be in enhanced coverage mode and to use PUCCH repetitions, and the processing circuitry is further configured to drop a sounding reference signal (SRS) transmission in a subframe in response to configuring the UE to retune to a different set of frequencies within the system bandwidth for an immediately following subframe and being scheduled to transmit a periodic or aperiodic SRS transmission in the subframe.

In Example 17, the subject matter of one or any combination of Examples 1-16 can optionally include that the UE is a Machine Type Communications (MTC) UE having reduced bandwidth support such that the MTC UE with reduced bandwidth support is restricted to communicate with the eNB over a limited set of subcarriers of the system bandwidth; and the processing circuitry is further configured to configure the transceiver to refrain from transmitting a physical uplink shared channel (PUSCH) on a last symbol of the subframe to accommodate switching time for the MTC UE to retune to a different set of frequencies within the system bandwidth for repeated PUSCH transmissions with frequency hopping.

In Example 18, the subject matter of one or any combination of Examples 17 can optionally include that a parameter $N_{symb}^{PUCCH}$ indicating a number of available symbols for PUSCH transmission in a subframe $N_{symb}^{PUSCH}=(2 \cdot (N_{symb}^{UL}-1)-N_X)$, where $N_X=N_{SRS}+N_{MTC\_retTime}$, and at least one of: $N_{MTC\_retTime}=1$ for a subframe if the MTC UE with reduced bandwidth support is to retune to a different set of frequencies within the system bandwidth for an immediately following subframe and if $N_{SRS}=0$ for the immediately following subframe, and $N_{MTC\_retTime}=0$ otherwise, and $N_X=1$ for all subframes for MTC UEs with reduced bandwidth support.

In Example 19, the subject matter of one or any combination of Examples 1-18 can optionally include that the processing circuitry is further configured to drop a sounding reference signal (SRS) transmission in a subframe in response to configuring the UE to retune to a different set of frequencies within the system bandwidth for an immediately following subframe and being scheduled to transmit a periodic or aperiodic SRS transmission in the immediately following subframe.

In Example 20, the subject matter of one or any combination of Examples 1-19 can optionally include that the PUCCH corresponds to PUCCH format 1a/1b.

In Example 21, the subject matter of one or any combination of Examples 1-20 can optionally include an antenna configured to transmit and receive communications between the transceiver and the eNB.

In Example 22, an apparatus of an eNode B (eNB) may comprise: processing circuitry configured to: determine whether User equipment (UE) served by the eNB is in one of a normal mode and an enhanced coverage (EC) mode; determine whether the UE is a Machine Type Communications (MTC) UE having reduced bandwidth support such that the MTC UE with reduced bandwidth support is restricted to communicate with the eNB over a limited set of subcarriers of a system bandwidth over which the eNB is able to communicate: and configure a transceiver to transmit a resource allocation for a physical uplink control channel (PUCCH) dependent on whether the UE is an MTC UE and whether the UE is in an EC mode, the resource allocation established in one of a legacy PUCCH region, an MTC PUCCH region reserved for MTC UEs with reduced bandwidth support and an MTC-EC PUCCH region, the legacy PUCCH region comprising physical resource blocks (PRBs) adjacent to edges of the system bandwidth in at least one of a first and second slot of a subframe, the MTC PUCCH region comprising PRBs reserved for MTC Us and the MTC-EC PUCCH region comprising PRBs reserved for MTC EC UEs.

In Example 23, the subject matter of Example 22 can optionally include that the resource allocation comprises inter-slot frequency hopping.

In Example 24, the subject matter of one or any combination of Examples 22-23 can optionally include that the processing circuitry is further configured to configure the transceiver to transmit higher layer signaling indicating a number of PRBs contained within one of the MTC PUCCH region and MTC-EC PUCCH region and a PRB offset for the UE, wherein the higher layer signaling indicates one or two starting offsets of a PUCCH for the UE, the starting offsets configured in a cell- or UE-specific manner, with use of a mirrored frequency hopping about the uplink system bandwidth based on an indication of a single starting offset, and on a per-slot basis or per-set of N subframes basis based on an indication of two starting oil sets.

In Example 25, the subject matter of one or any combination of Examples 22-24 can optionally include that the resource allocation comprises a shortened PUCCH format configured to accommodate an extended retuning time, and the shortened PUCCH format comprises a length-3 Orthogonal Cover Code (OCC) in the at least one of the first and second slot of the subframe.

In Example 26, the subject matter of one or any combination of Examples 22-25 can optionally include that the processing circuitry is further configured to configure the transceiver to expect the UE to drop a sounding reference signal (SRS) transmission in a subframe in response to the UE to retune to a different set of frequencies within the system bandwidth for an immediately following subframe and being scheduled to transmit a periodic or aperiodic SRS transmission in the subframe.

In Example 27, the subject matter of one or any combination of Examples 22-26 can optionally include that the processing circuitry is further configured to the processing circuitry is further configured to configure the transceiver to expect the UE to refrain from transmitting a physical uplink shared channel (PUSCH) on a last symbol of the subframe to accommodate switching time for the MTC UE to retune to a different set of frequencies within the system bandwidth for repeated PUSCH transmissions with frequency hopping.

Example 28 may comprise a non-transitory computer-readable storage medium that stores instructions for execution by one or more processors of a Machine Type Communications (MTC) user equipment (UE) to configure the MTC UE to communicate with an enhanced Node B (eNB), the one or more processors to configure the MTC UE to: restrict bandwidth support such that communication with the eNB is limited to a subset of subcarriers of a system bandwidth over which the eNB is able to communicate; receive a resource allocation for a physical uplink control channel (PUCCH) in a MTC PUCCH region separate from a legacy PUCCH region, the legacy PUCCH region comprising physical resource blocks (PRBs) adjacent to edges of the system bandwidth in at least one of a first and second slot of a subframe, the MTC PUCCH region comprising PRBs reserved for MTC UEs; and transmit a PUCCH in the PUCCH region using frequent hopping.

In Example 29, the subject matter of Example 28 can optionally include that the one or more processors further configure the MTC UE to at least one of: a) receive higher layer signaling indicating a number of PRBs contained within the PUCCH region and a PRB offset for the MTC UE, wherein the higher layer signaling indicates starting offsets of a PUCCH for the MTC UE, the starting offsets configured in a cell- or UE-specific manner, with use of a mirrored frequency hopping about the uplink system bandwidth based on an indication of a single starting offset, and on a per-slot basis or, when the MTC UE is in an enhanced coverage mode, a per-set of N subframes basis based on an indication of two starting offsets, b) use shortened PUCCH format comprising a length-3 Orthogonal Cover Code (OCC) to accommodate an extended retuning time in at least one of the first and second slot of the subframe, and puncture at least one of a first and last symbol of at least one of the first and second slot, and c) use PUCCH repetitions when the MTC UE is in an enhanced coverage mode, and drop a sounding reference signal (SRS) transmission in a subframe in response to configuring the UE to retune to a different set of frequencies within the system bandwidth for an immediately following subframe and being scheduled to transmit a periodic or aperiodic SRS transmission in the immediately following subframe.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B" unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A User equipment device (UE) comprising:
a transceiver configured to transmit signals to a base station; and
a processor operably coupled to the transceiver and configured to cause the UE to:
operate in an enhanced coverage (EC) mode;
determine a physical uplink control channel (PUCCH) resource allocation; and
transmit the PUCCH according to the PUCCH resource allocation, wherein:
the PUCCH resource allocation includes inter-subframe frequency hopping between physical resource blocks between sets of N subframes, wherein the PUCCH resource allocation including inter-subframe frequency hopping uses frequency resources of the same one physical resource block in both slots of a subframe, wherein a value of N is configured by the base station with N greater than or equal to 1, wherein the PUCCH resource allocation includes a number of configured PUCCH repetitions, and
when the inter-subframe frequency hopping is enabled, said transmitting the PUCCH includes puncturing a first symbol of a first slot of a first subframe at a frequency hopping boundary or puncturing a last symbol of a second slot of a second subframe at the frequency hopping boundary.

2. The UE of claim 1, wherein a frequency hopping pattern is cell-specific.

3. The UE of claim 1, wherein the PUCCH is a shortened PUCCH.

4. The UE of claim 1, wherein the processor is further configured to cause the UE to perform frequency hopping for a physical uplink shared channel (PUSCH) transmission.

5. The UE of claim 1, wherein the PUCCH resource allocation is symmetric around a center frequency of an uplink system bandwidth.

6. The UE of claim 1, wherein the UE is a machine-type communication (MTC) UE configured to refrain from transmitting physical uplink shared channel (PUSCH) on a last symbol of a first subframe.

7. The UE of claim 1, wherein the PUCCH corresponds to PUCCH format 1a or 1b.

8. The UE of claim 1, wherein, when said inter-subframe frequency hopping is enabled, said transmitting the PUCCH further includes puncturing the first symbol of the first slot of the first subframe and puncturing the last symbol of the second slot of the second subframe at the frequency hopping boundary.

9. An apparatus for operating a user equipment device (UE), the apparatus comprising:
a processor configured to cause the UE to:
operate in an enhanced coverage (EC) mode;
determine a physical uplink control channel (PUCCH) resource allocation; and
transmit the PUCCH according to the PUCCH resource allocation, wherein:
the PUCCH resource allocation includes inter-subframe frequency hopping between physical resource blocks between sets of N subframes, wherein the PUCCH resource allocation including inter-subframe frequency hopping uses frequency resources of the same one physical resource block in both slots of a subframe, wherein a value of N is configured by a base station with N greater than or equal to 1, wherein the PUCCH resource allocation includes a number of configured PUCCH repetitions, and
when the inter-subframe frequency hopping is enabled, said transmitting the PUCCH includes puncturing a first symbol of a first slot of a first subframe at a frequency hopping boundary or puncturing a last symbol of a second slot of a second subframe at the frequency hopping boundary.

10. The apparatus of claim 9, wherein a frequency hopping pattern is cell-specific.

11. The apparatus of claim 9, wherein the PUCCH is a shortened PUCCH.

12. The apparatus of claim 9, wherein the processor is further configured to cause the UE to perform frequency hopping for a physical uplink shared channel (PUSCH) transmission.

13. The apparatus of claim 9, wherein the PUCCH resource allocation is symmetric around a center frequency of an uplink system bandwidth.

14. The apparatus of claim 9, wherein the UE is a machine-type communication (MTC) UE configured to refrain from transmitting physical uplink shared channel (PUSCH) on a last symbol of a first subframe.

15. The apparatus of claim 9, wherein the PUCCH corresponds to PUCCH format 1a or 1b.

16. The apparatus of claim 9, wherein, when said inter-subframe frequency hopping is enabled, said transmitting the PUCCH further includes puncturing the first symbol of the first slot of the first subframe and puncturing the last symbol of the second slot of the second subframe at the frequency hopping boundary.

17. A method for operating a user equipment device (UE), the method comprising:
at the UE:
operating in an enhanced coverage (EC) mode;
determining a physical uplink control channel (PUCCH) resource allocation; and
transmitting the PUCCH according to the PUCCH resource allocation, wherein:
the PUCCH resource allocation includes inter-subframe frequency hopping between physical resource blocks between sets of N subframes, wherein the PUCCH resource allocation including inter-subframe frequency hopping uses frequency resources of the same one physical resource block in both slots of a subframe, wherein a value of N is configured by a base station with N greater than or equal to 1, wherein the PUCCH resource allocation includes a number of configured PUCCH repetitions, and
when the inter-subframe frequency hopping is enabled, said transmitting the PUCCH includes puncturing a first symbol of a first slot of a first subframe at a frequency hopping boundary or puncturing a last symbol of a second slot of a second subframe at the frequency hopping boundary.

18. The method of claim 17, wherein a frequency hopping pattern is cell-specific.

19. The method of claim 17, wherein the PUCCH is a shortened PUCCH.

20. The method of claim 17, wherein, when said inter-subframe frequency hopping is enabled, said transmitting the PUCCH further includes puncturing the first symbol of the first slot of the first subframe and puncturing the last symbol of the second slot of the second subframe at the frequency hopping boundary.

* * * * *